(12) United States Patent
Koch et al.

(10) Patent No.: US 11,674,711 B2
(45) Date of Patent: Jun. 13, 2023

(54) HVAC CONTROLLER ASSEMBLIES INCLUDING AIR FLOW INTRUSION BARRIERS

(71) Applicant: Watts Regulator Co., North Andover, MA (US)

(72) Inventors: Brendan Koch, Coldstream (CA); Allen Mayes, Armstrong (CA); Jay Vath, Coldstream (CA); Serge Seminutin, Vernon (CA)

(73) Assignee: WATTS REGULATOR CO., North Andover, MA (US)

( * ) Notice: Subject to any disclaimer, the term of this patent is extended or adjusted under 35 U.S.C. 154(b) by 332 days.

(21) Appl. No.: 16/927,874

(22) Filed: Jul. 13, 2020

(65) Prior Publication Data

US 2022/0011005 A1 Jan. 13, 2022

(51) Int. Cl.
  *A47J 39/00* (2006.01)
  *F24F 11/89* (2018.01)
  *H02G 3/22* (2006.01)
  *F16L 5/02* (2006.01)

(52) U.S. Cl.
  CPC ............. *F24F 11/89* (2018.01); *F16L 5/02* (2013.01); *H02G 3/22* (2013.01)

(58) Field of Classification Search
  CPC .............. F24F 11/89; F16L 5/02; H02G 3/22
  USPC ........................................................ 165/201
  See application file for complete search history.

(56) References Cited

U.S. PATENT DOCUMENTS

| | | | |
|---|---|---|---|
| 6,597,275 B2 | 7/2003 | Morrow et al. | |
| 7,617,988 B2 | 11/2009 | Morrow et al. | |
| 9,282,654 B2 | 3/2016 | Bick et al. | |
| 10,908,470 B2 * | 2/2021 | Brown | E06B 9/24 |
| 2015/0160691 A1 * | 6/2015 | Kadah | G06F 3/04895 700/83 |
| 2015/0322672 A1 * | 11/2015 | Deivasigamani | H02G 3/22 52/27 |
| 2016/0327308 A1 * | 11/2016 | Deivasigamani | E04B 1/64 |
| 2019/0123540 A1 * | 4/2019 | Nakamura | H02G 3/22 |
| 2020/0173582 A1 * | 6/2020 | Persson | F16L 5/02 |
| 2022/0011005 A1 * | 1/2022 | Koch | F24F 11/89 |

OTHER PUBLICATIONS

Invita WiFi Thermostat, tekmar 2018.

* cited by examiner

*Primary Examiner* — Claire E Rojohn, III
(74) *Attorney, Agent, or Firm* — Grossman, Tucker, Perreault & Pfleger, PLLC

(57) ABSTRACT

A heating, ventilation, and/or air condition (HVAC) controller assembly to reduce undesired air currents includes a front cover, a back plate configured to be removably secured to the front cover, HVAC controller circuitry, a plurality of wire openings, and an air intrusion barrier configured to extend across the wire openings. The HVAC controller circuitry is configured to be electrically coupled to a plurality of wires extending through a hole in the wall to adjust an environmental characteristic of in a controlled space. Each wire opening is configured to receive only a single wire and each wire is configured to extend through a different one of the wire openings. The air intrusion barrier is configured to receive the wires to generally form a plurality of seals against the wires. The wire openings are configured to substantially support the wires to reduce movement of the wires relative to the air intrusion barrier.

20 Claims, 13 Drawing Sheets

HVAC CONTROLLER ASSEMBLIES INCLUDING AIR FLOW INTRUSION BARRIERS

TECHNICAL FIELD

The present disclosure is generally directed to systems and methods for improving the performance of a heating, ventilation, and/or air condition (HVAC) controller, and more specifically to HVAC controller assemblies including air flow intrusion barriers.

BACKGROUND INFORMATION

One of the goals of heating, ventilation, and/or air condition (HVAC) systems is to maintain one or more environmental characteristics of the air in a building or other structure (e.g., a room) within a predefined range. HVAC systems often utilize an HVAC controller which is mounted to a wall within the room. The HVAC controller generally monitors/detects one or more environmental characteristics of the air within the room (such as, but not limited to, the temperature) and outputs one or more signals which control one or more HVAC components of the HVAC system in order to maintain the environmental characteristic(s) within the predefined range.

In many applications (e.g., but not limited to, residential applications), the HVAC controller is mounted to an interior wall using a HVAC wall plate assembly. The HVAC controller is coupled to various HVAC components of the HVAC system by wires extending through a hole or penetration in the wall. While such systems are generally effective, the hole in the wall is often much larger than the wires, and as a result, undesired air currents may flow through this hole in the wall (e.g., due to differential air pressure between the room and the wall cavity). These undesired air currents may negatively impact the ability of the HVAC controller to maintain environmental characteristics of the air within the room, or the natural convective action relied upon within the HVAC controller to measure accurate environmental conditions is altered and the HVAC controller receives incorrect information regarding the environment. For example, the temperature of the undesired air current may be different than the temperature of the air within the room. As a result, the HVAC controller may sense a temperature that is a composite of the actual room temperature and the temperature of the undesired air current through the hole, and the accuracy of the HVAC system as a whole may therefore be reduced.

HVAC wall plate assemblies have been designed to reduce the negative impact of these undesired air currents through the hole in the wall. For example, some of the known HVAC wall plate assemblies feature an air flow barrier configured to be mounted to the wall. The air flow barrier may include a single passage configured to be aligned with the hole in the wall and to receive all the wires. The passage in the air flow barrier may define an aperture that is smaller than the hole in the wall. As a result, the air flow barrier may reduce the undesired air current through the hole.

Unfortunately, these known HVAC wall plate assemblies suffer from several disadvantages. For example, the passage in the air flow barrier is very easily damaged during installation. The wires must be advanced through the passage in the air flow barrier and individually connected to the HVAC controller. While connecting the wires to the HVAC controller, each wire must be manipulated in order to align with the HVAC controller. The manipulation of the wires transmits forces through the wires which can cause the passage in the air flow barrier to rip or tear, because there is no other support for the wire movement except the barrier, thereby increasing the size of the aperture of the passage. The increased size of the passage aperture allows more of the undesired air current to flow through the passage, thereby reducing the effectiveness of the air flow barrier and negatively impacting the performance of the HVAC controller. Accidental damage to the passage in the air flow barrier is particularly problematic as the number of wires increases since all the wires extend through the same passage.

In addition, the installation of these known HVAC wall plate assemblies may be difficult. As noted above, all the wires must be advanced through the same passage in the air flow barrier. As the number of wires increases, it may become more difficult for the installer to advance additional wires through the passage, particularly without damaging the air flow barrier. Each additional wire may become caught on the wires that are already in the passageway, thereby requiring the installer to increase the amount of force exerted. In addition, each additional wire may increase the compressive force exerted by the air flow barrier, thereby increasing the force required to push the wires through the air flow barrier. In both cases, the increased force makes the installation more difficult and/or increases the likelihood of the installer accidentally damaging the air flow barrier.

BRIEF DESCRIPTION OF THE DRAWINGS

These and other features and advantages will be better understood by reading the following detailed description, taken together with the drawings, wherein.

DETAILED DESCRIPTION

By way of a general overview, the present disclosure is generally directed to heating, ventilation, and/or air condition (HVAC) controller assemblies (also known as HVAC wall plate assemblies and/or thermostats) that are configured to be mounted to a wall of a controlled space and reduce undesired air currents. A HVAC controller assembly consistent with at least one example of the present disclosure may include a front cover including at least one input/output device, a back plate configured to be secured to the wall and removably secured to the front cover, HVAC controller circuitry, a plurality of wire openings, and an air intrusion barrier configured to extend across the wire openings. The HVAC controller circuitry may be electrically coupled to one or more HVAC components of an HVAC system by way of a plurality of wires extending through a hole in the wall in order to adjust one or more environmental characteristics of the controlled space. Each of the plurality of wire openings may be configured to receive only a single wire of the plurality of wires, and each of the plurality of wires may extend through a different one of the plurality of wire openings. The air intrusion barrier may extend across the plurality of wire openings and be configured to receive the plurality of wires and to generally form a plurality of seals against the plurality of wires. The wire openings may be configured to substantially support the plurality of wires to reduce movement of the plurality of wires (e.g., lateral movement) relative to the air intrusion barrier and/or prevent wire lateral forces from damaging the air intrusion barrier.

In at least one example, the plurality of wire openings extend through the back plate and the air intrusion barrier may be configured to be secured to the back plate. For example, the air intrusion barrier may include at least one membrane configured to form the plurality of seals against the wires and an adhesive layer configured secure the air intrusion barrier to the back plate. The HVAC controller assembly may optionally include a wall plate configured to be disposed between the back plate and the wall when the HVAC controller assembly is secured to the wall. The plurality of wire openings may extend through the wall plate, and the air intrusion barrier may be configured to be secured to the wall plate.

Figure 1:
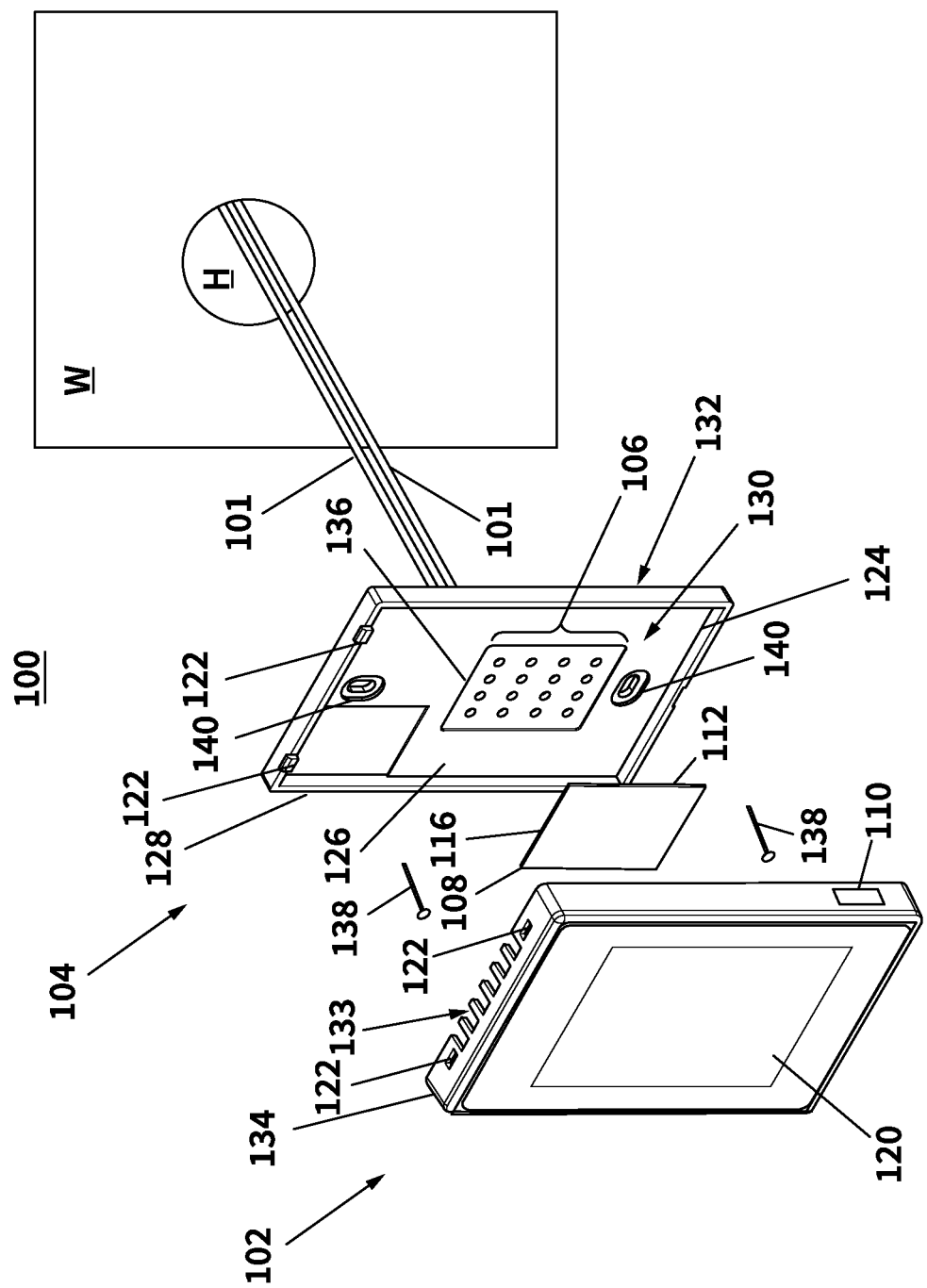
FIG. 1 is an exploded view of an example of a heating, ventilation, and/or air condition (HVAC) controller assembly including a front plate, a back plate, and an air intrusion barrier, consistent with the present disclosure.
Figure 2:
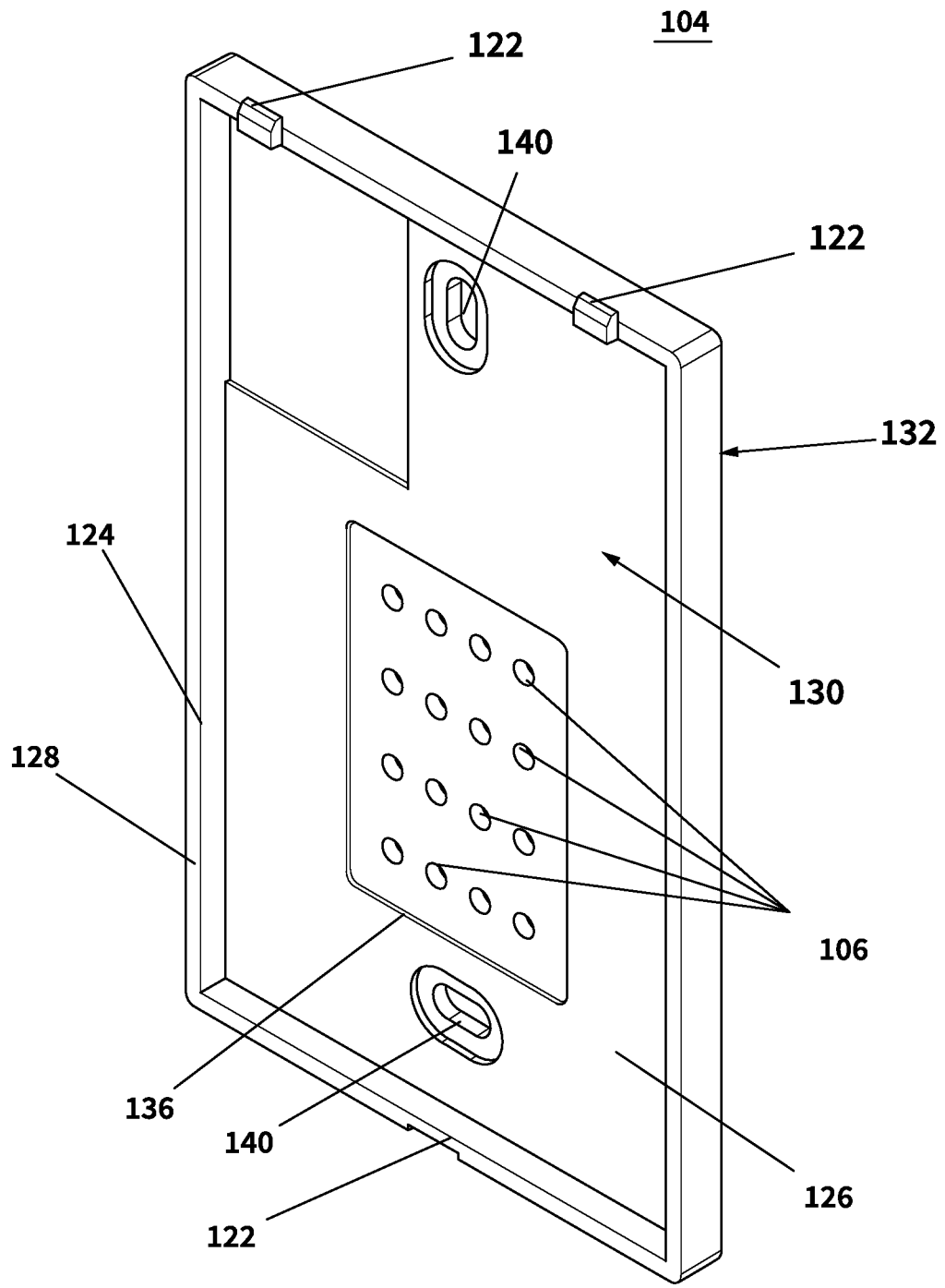
FIG. 2 is a front perspective view of one example of the back plate of FIG. 1, consistent with the present disclosure.
Figure 3:
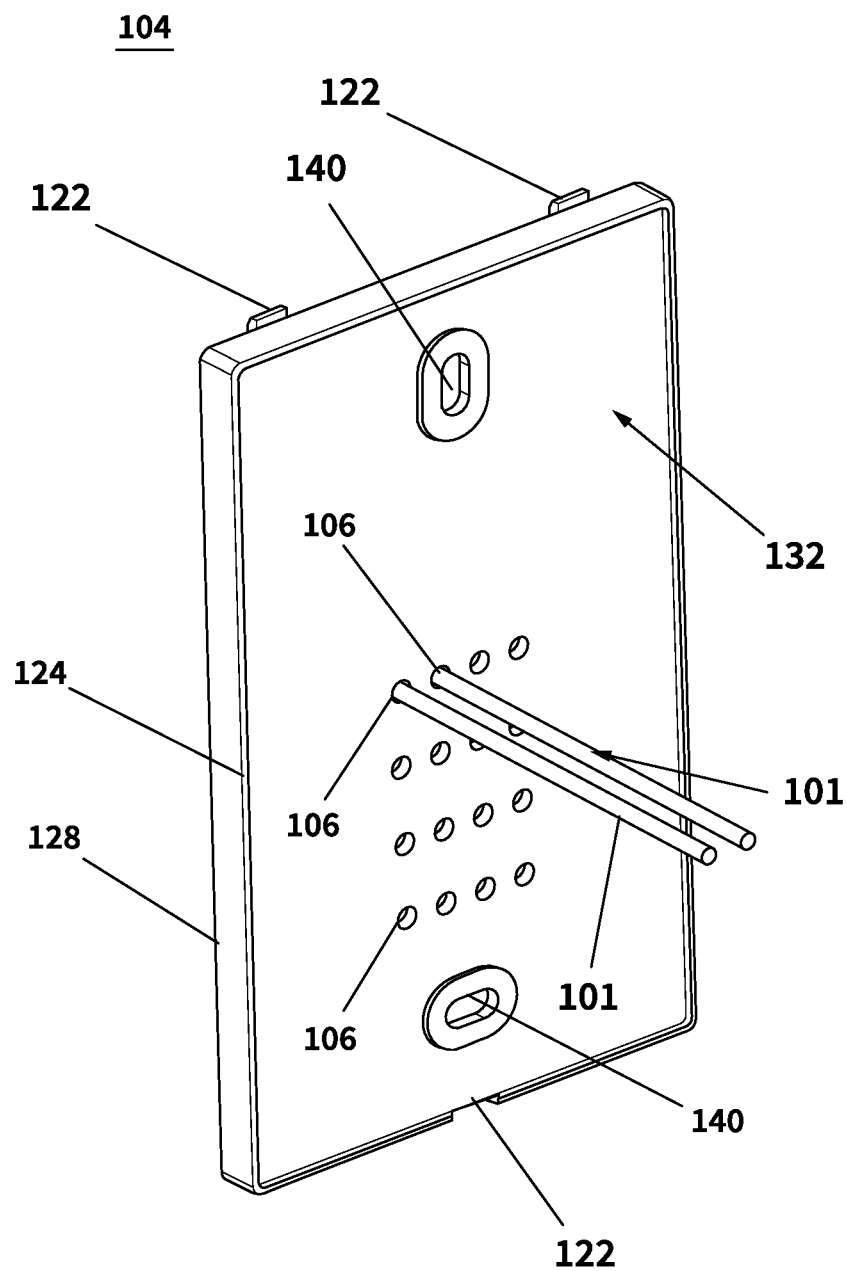
FIG. 3 is a rear perspective view of the back plate of FIG. 1 with a plurality of wires extending through the plurality of wire openings, consistent with the present disclosure.

With reference to FIG. 1, an exploded view of a heating, ventilation, and/or air condition (HVAC) controller assembly 100 consistent with at least one example of the present disclosure is generally illustrated. The HVAC controller assembly 100 is configured to be mounted to a wall W and to be electrically coupled, by way of a plurality of wires 101, to one or more HVAC components of an HVAC system (such as, but not limited to, fans, compressors, filters, humidifiers, air conditioners, heat pumps, furnaces, heating wires, base boards, or the like, not shown for clarity) in order to adjust and/or maintain one or more environmental characteristic(s) of the air in a building or other structure (e.g., a controlled space) within a predefined range. The HVAC controller assembly 100 may include a front cover 102, a back plate 104 including a plurality of wire openings 106, at least one air intrusion barrier 108 configured to extend across the plurality of wire openings 106, and HVAC controller 110 for adjusting and/or maintaining one or more environmental characteristics of the controlled space (such as, but not limited to, temperature, humidity, pressure, air quality, and the like) within the predefined range. The plurality of wires 101 are configured to extend through the wire openings 106 and the air intrusion barrier 108. As described herein, the air intrusion barrier 108 is configured to reduce and/or eliminate undesired air currents that may otherwise flow through a hole or penetration H in the wall W that would otherwise negatively impact the performance of the HVAC controller assembly 100.

The HVAC controller circuitry 110 may include any HVAC controller circuitry known to those skilled in the art. Non-limiting examples of the HVAC controller circuitry 110 include the HVAC controller circuitry of the Invita™ WiFi thermostat, tekmarNet® thermostat 532, tekmarNet® thermostat 552, tekmarNet® thermostat 553, tekmarNet® thermostat 554, tekmarNet® thermostat 557, WiFi thermostat 561, WiFi thermostat 562, and WiFi thermostat 563, all of which are commercially available by Tekmar® and fully incorporated herein by reference. While the HVAC controller circuitry 110 is illustrated as part of the front cover 102, it should be appreciated that all or part of the HVAC controller circuitry 110 may be located anywhere in the HVAC controller assembly 100 such as, but not limited to, the back plate 104 and/or an optional wall plate.

The air intrusion barrier 108 may extend across the plurality of wire openings 106 and the plurality of wires 101 are configured to pass through the air intrusion barrier 108. For example, the air intrusion barrier 108 may be configured to receive the plurality of wires 101 through individual holes formed in the air intrusion barrier 108 which individually seal against the plurality of wires 101. The air intrusion barrier 108 is configured to reduce and/or eliminate undesired air currents that may otherwise flow through a hole or penetration H in the wall W and negatively impact the performance of the HVAC controller assembly 100 (e.g., reducing and/or eliminating undesired air currents from negatively influencing the HVAC controller circuitry 110).

In at least one example, the air intrusion barrier 108 includes at least one layer or membrane 112 configured to generally form a plurality of seals with the wires 101. The air intrusion barrier 108 may include, at least in part, any material configured to generally form a seal with the wires 101. As used herein, forming a seal with the wires 101 does not require a perfect air-tight seal, but rather, that the air intrusion barrier 108 reduces the amount of air that would otherwise flow through the wire openings 106. By way of a non-limiting example, the air intrusion barrier 108 may reduce the amount of air that would otherwise flow through the wire openings 106 by at least 50%, at least 75%, at least 90%, for example, 95-99%, including all values and ranges therein. For example, the individual holes formed in the air intrusion barrier 108 may be smaller than the wire openings 106. At least a portion of the membrane 112 may include one or more layers of a resiliently deformable material. For example, at least a portion of the membrane 112 may include, but is not limited to, one or more polyolefins (e.g., but not limited to, polypropylene), polyesters, rubbers, closed cell resilient flexible plastic materials, foam materials, and/or generally soft, resilient materials. In some examples, at least a portion of the membrane 112 may be formed from a closed-cell urethane foam or a closed-cell polyethylene foam. By way of a non-limiting example, the air intrusion barrier may include a 4 mil (0.004 inch) thick mono-oriented polyolefin film, e.g., with high opacity and excellent cross directional tear resistance such as the TransCode® film which is commercially available from Fasson®. The air intrusion barrier 108 may optionally include, at least in part, a woven material configured to resist tearing by distributing force exerted by the wires 101. The woven material may part of and/or separate from the membrane 112.

The air intrusion barrier 108 may be secured to the front surface 130 of the back plate 104 (i.e., a surface of the back plate 104 configured to generally face towards the front cover 102 when assembled), e.g., as generally shown in FIGS. 4-7. In one example, the air intrusion barrier 108 may be secured to the back plate 104 using one or more layers of an adhesive 116 such as, but not limited to, a pressure sensitive adhesive or the like. The adhesive 116 may be rated to at least 40° C., and may include indoor and/or outdoor rated adhesives. By way of a non-limiting example, the adhesive 116 may include a 0.0006 inch thick layer of a clear acrylic adhesive, e.g., offering high initial tack and cold temperature properties when applied to most packaging films such as the S475 adhesive commercially available from Fasson®. It should be appreciated, however, that the air intrusion barrier 108 may be secured to the back plate 104 in any manner known to those skilled in the art. For example, the air intrusion barrier 108 may be welded (e.g., sonically welded) and/or molded (e.g., over-molded) to the back plate 104.

Figure 4:
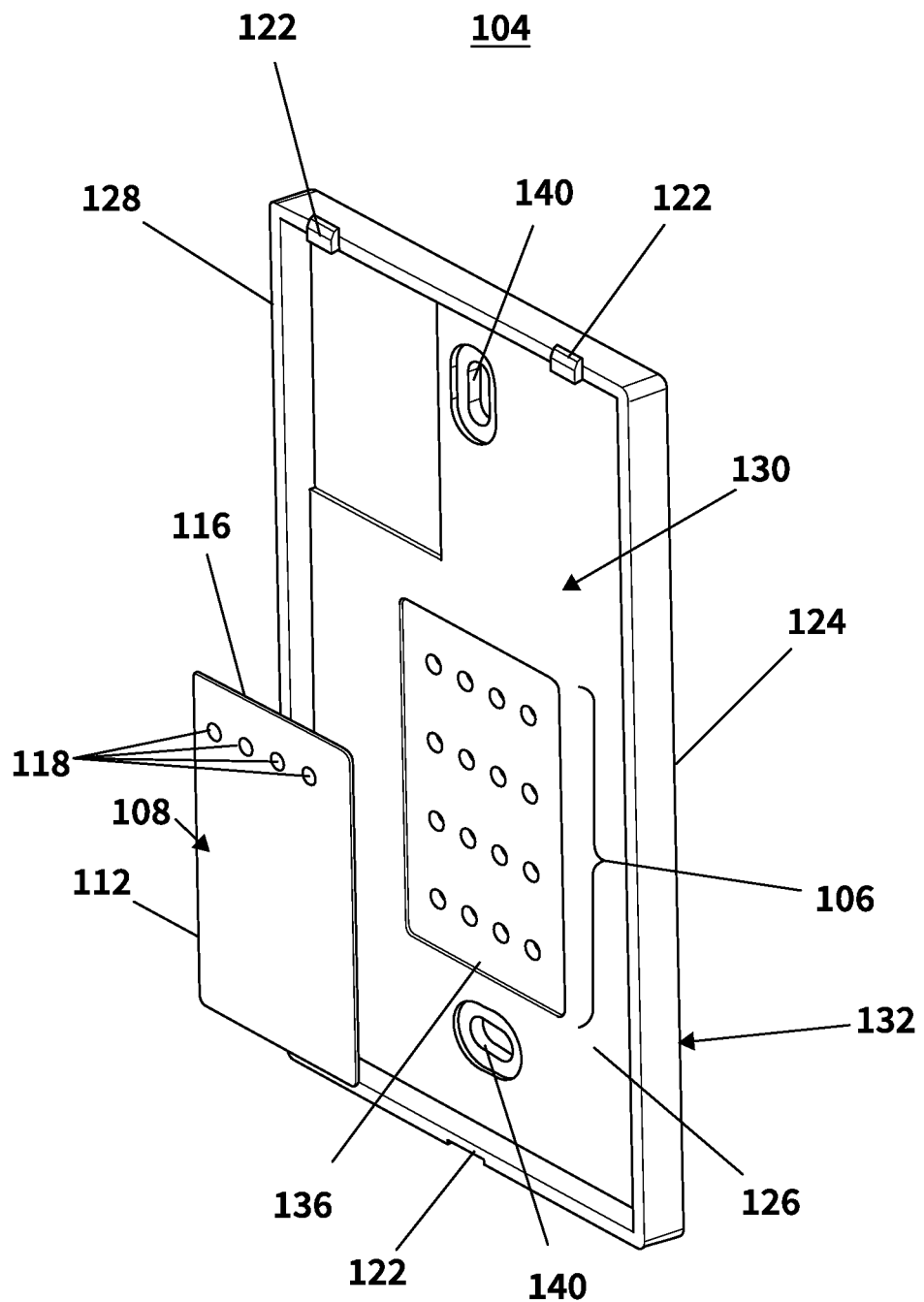
FIG. 4 is an exploded front perspective view of one example of the back plate and the air intrusion barrier of FIG. 1, consistent with the present disclosure.
Figure 5:
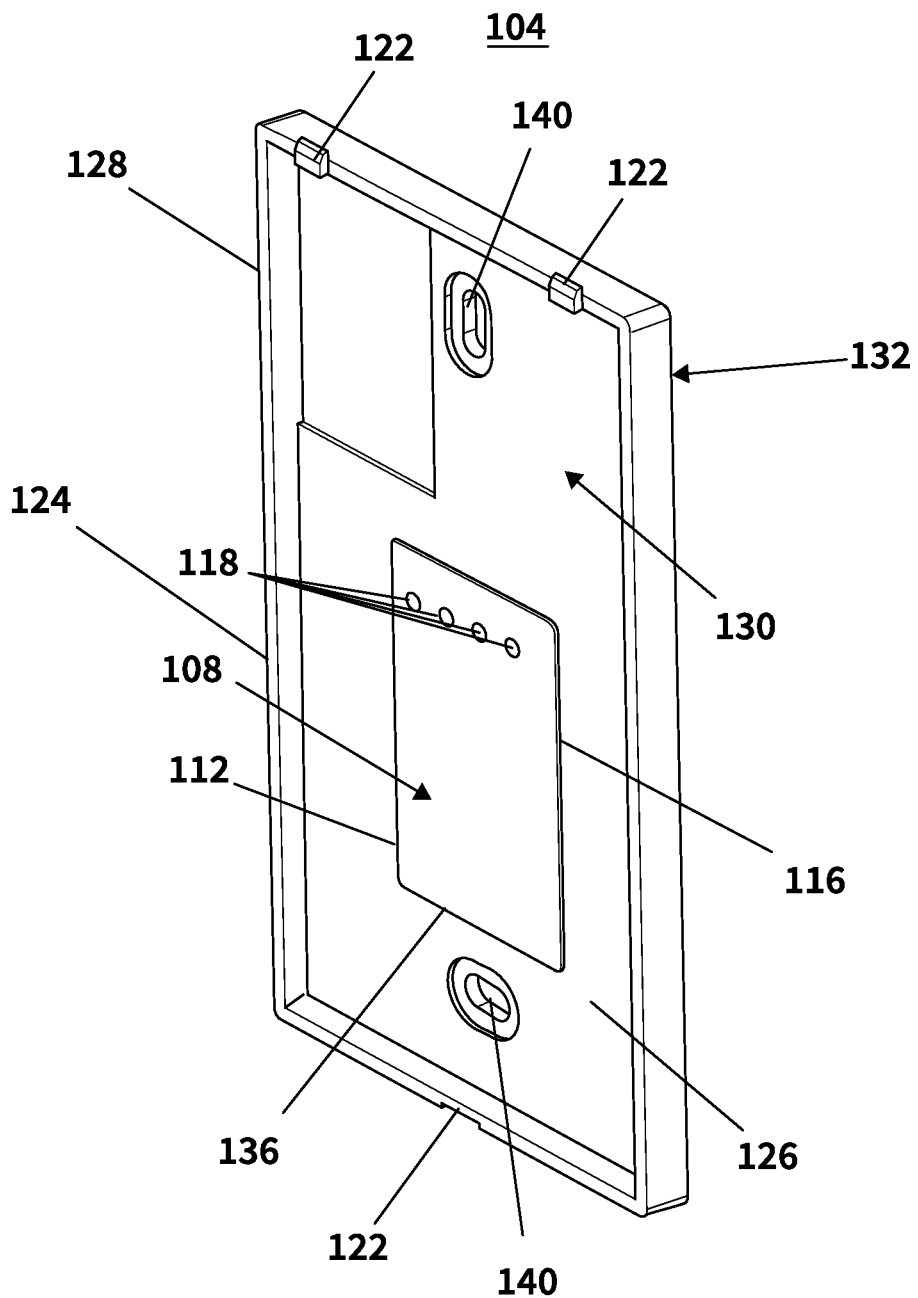
FIG. 5 is an assembled view of the back plate and the air intrusion barrier of FIG. 4, consistent with the present disclosure.

The air intrusion barrier 108 may optionally include one or more perforations 118 (best seen in FIGS. 4-5). The perforations 118 may be generally aligned with the wire openings 106 and may be configured to facilitate the advancement of the wires 101 through the air intrusion barrier 108. In at least one example, one or more of the perforations 118 extend only partially through the air intrusion barrier 108. Alternatively (or in addition), one or more of the perforations 118 may extend all the way through the air intrusion barrier 108. The air intrusion barrier 108 may optionally be configured to generally seal the perforations 118 even when a wire 101 is not extending therethrough.

The front cover 102 may include one or more input/output devices 120 such as, but not limited to, a display (e.g., a touch screen), buttons, knobs, switches, dials, combinations thereof, or the like. The input/output devices 120 may be used to adjust/set one or more environmental characteristics to be adjusted/maintained by the HVAC controller assembly 100 as is well known. The front cover 102 may be configured to be removably coupled, mounted, or otherwise secured to the back plate 104 in any manner know to those skilled in the art. By way of non-limited examples, the front cover 102 may be secured to the back plate 104 using one or more biased tabs, fasteners, clamps, or the like 122.

Figure 6:
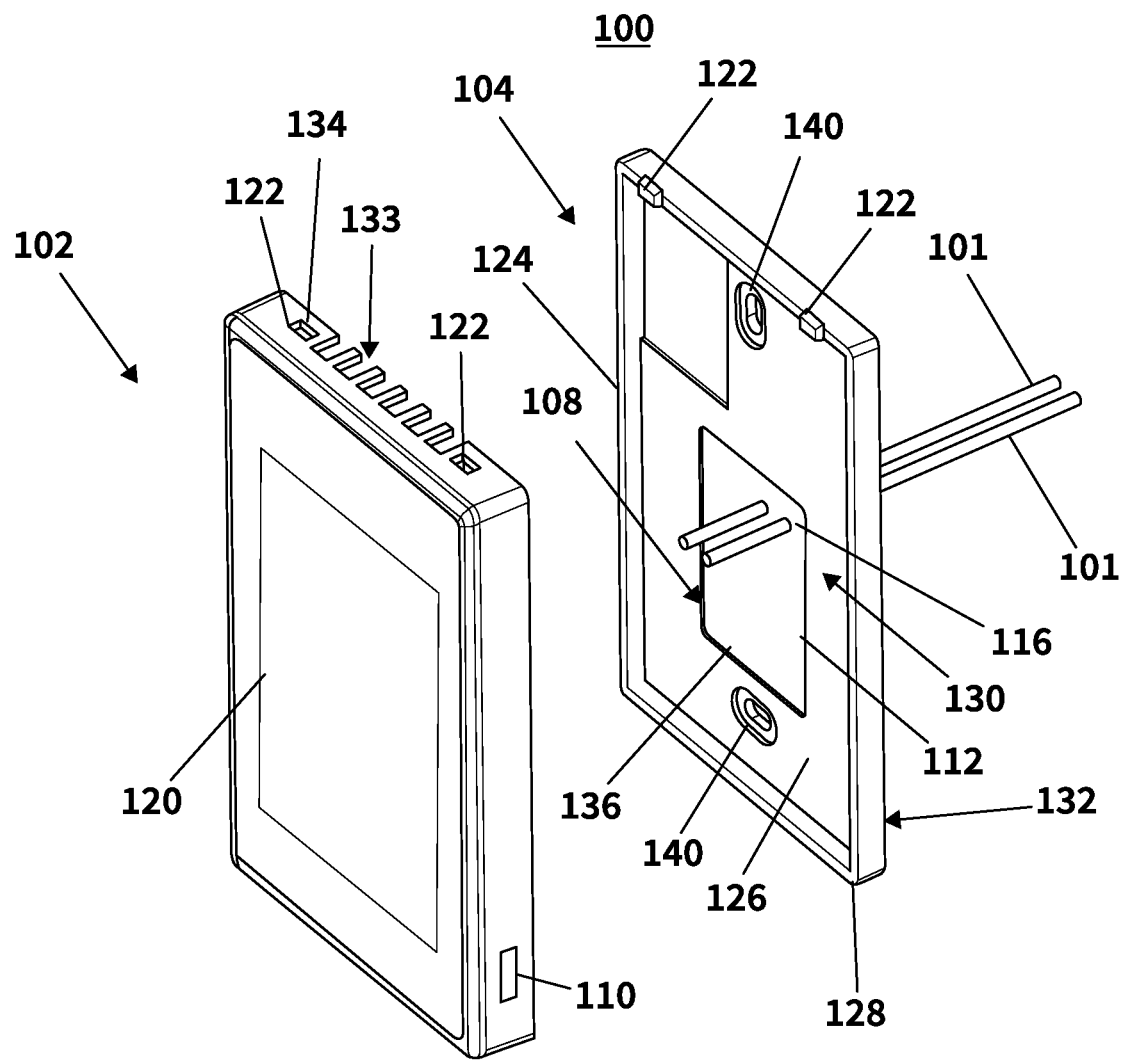
FIG. 6 is an exploded view of the front plate and the air intrusion barrier secured to the back plate and a plurality of wires extending through the plurality of wire openings and the air intrusion barrier, consistent with the present disclosure.
Figure 7:
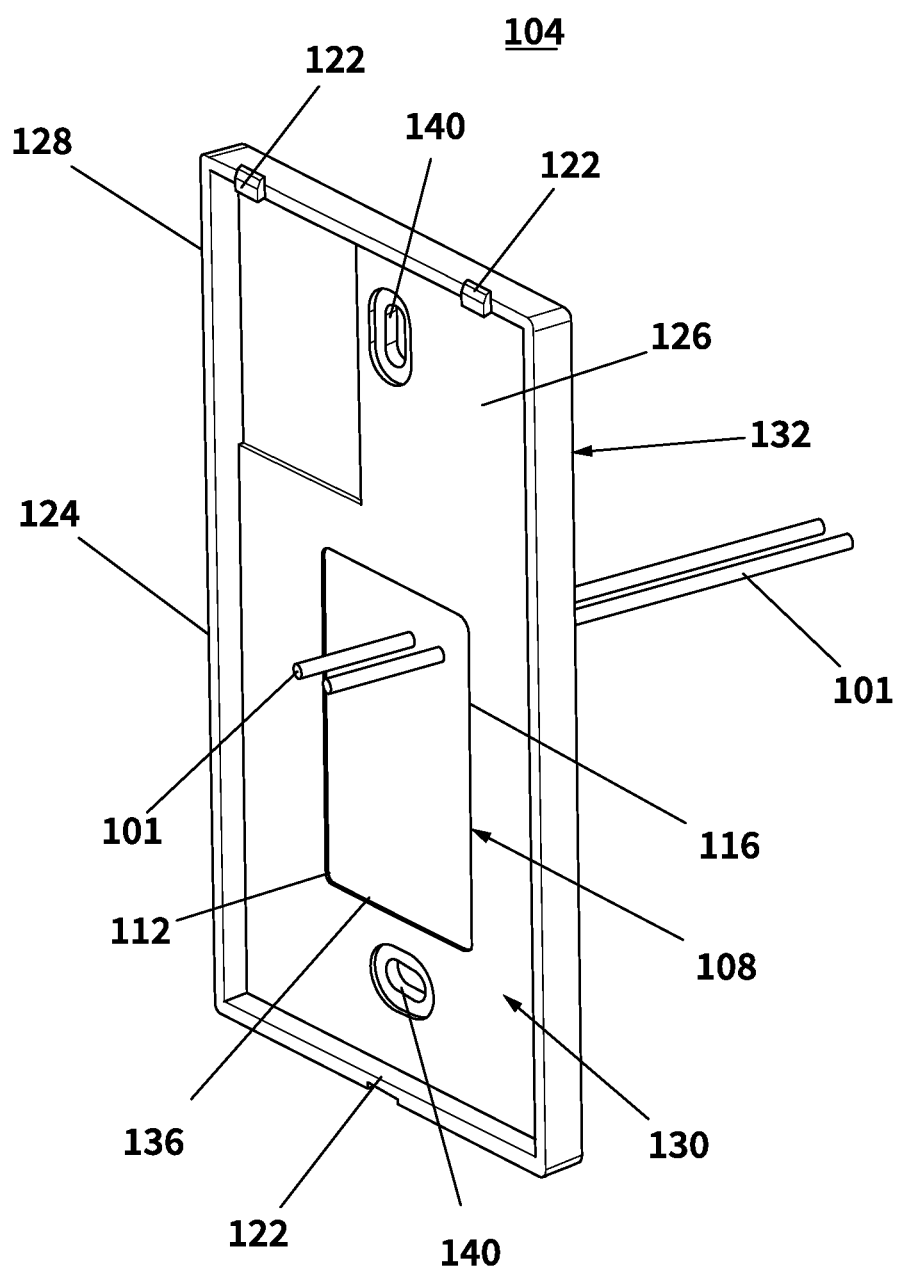
FIG. 7 is a front perspective view of the air intrusion barrier secured to the back plate and a plurality of wires extending through the plurality of wire openings and the air intrusion barrier, consistent with the present disclosure.

The back plate 104 may include a back plate body 124 having at least one rear wall 126 and optionally one or more sidewalls 128. The back plate 104 (e.g., the rear wall 126) includes a front surface 130 configured to generally face the front plate 102 and a rear surface 132 configured to generally face the wall W when the HVAC controller assembly 100 is coupled to the wall W. The back plate 104 and/or the front cover 102 may define one or more air passages 133 (e.g., as generally illustrated in FIGS. 1 and 6) open to the air in the controlled space for providing air to the HVAC controller 110 (e.g., but not limited to, the thermistor sensing element) to sense/detect the environmental characteristic(s) to be adjusted/maintained by the HVAC controller assembly 100. In at least one example, the air passages 133 may be disposed between the front surface 130 of the back plate 104 and the face plate 102. For instance, one or more air passages 133 may extend between a sidewall 134 of the front plate 102 and the back plate 104 as shown, though other configurations are possible. The air intrusion barrier 108 may be configured to reduce and/or eliminate undesired air currents from flowing through the air passages 133 and negatively impact the performance of the HVAC controller assembly 100.

In the illustrated example, the wire openings 106 extend through the rear wall 126 in a grid pattern, however, it should be appreciated that the wire openings 106 may be located anywhere and/or in any arrangement on the back plate 104. The back plate 104 (e.g., the rear wall 126) may optionally include one or more air intrusion barrier location indicia 136. The air intrusion barrier location indicia 136 may be used to locate and/or position the air intrusion barrier 108 on the back plate 104 and/or relative to the wire openings 106. For example, the air intrusion barrier location indicia 136 may be used to generally align the perforations 118 of the air intrusion barrier 108 with the wire openings 106.

The back plate 104 may be configured to be removably coupled, mounted, or otherwise secured to the wall W using one or more fasteners 138, for example, configured to be advanced through one or more apertures 140 in the back plate body 124 (e.g., but not limited to, the rear wall 126). The back plate 104 may be positioned on the wall W so that one or more of the wire openings 106 are generally aligned with a hole or penetration H in the wall W and/or the wires 101 extending through the hole H.

As noted herein, the wires 101 are configured to individually extend through the wire openings 106 and individually extend through the air intrusion barrier 108. Each one of the plurality of wire openings 106 may be sized and/or shaped to substantially correspond to the cross-section (e.g., outer diameter) of each one of the plurality of wires 101. Put another way, each of the plurality of wire openings 106 may be sized and/or shaped to receive only a single wire 101, and each wire 101 may extend through a different wire opening 106. The size and/or shape of the plurality of wire openings 106 may be configured to substantially support the wires 101 to reduce movement of the wires 101 (e.g., lateral movement) relative to the back plate 104 and/or prevent wire lateral forces from damaging the air intrusion barrier 108 during installation.

The specific dimensions of the wire openings 106 may therefore depend on the size (e.g., the outer dimension/diameter) of the wires 101 configured to be electrically coupled to the HVAC controller assembly 100. For example, the size of the wire openings 106 may be up to 5% larger than the size (i.e., outer dimension) of the wires 101, for example, up to 10% larger than the size of the wires 101, up to 15% larger than the size of the wires 101, up to 20% larger than the size of the wires 101, up to 25% larger than the size of the wires 101, up to 30% larger than the size of the wires 101, up to 35% larger than the size of the wires 101, and/or up to 40% larger than the size of the wires 101, including all ranges and values therein. By way of non-limiting examples, the wires 101 may include 20-10 gauge wires, for example, 14-18 gauge wires. In at least one example, the wires 101 may have an outer diameter of approximately 0.08 inch and the wire openings 106 may have a diameter of 0.1063 inch (i.e., the wire openings 106 may be approximately 32% larger than the wire 101).

In at least one example, two or more of the plurality of wire openings 106 may have the same size. Alternatively (or in addition), two or more of the plurality of wire openings 106 may have different sizes. The different sizes may correspond to different types (e.g., sizes) of wires 101 that are electrically coupled to the HVAC controller assembly 100. For example, the HVAC controller assembly 100 maybe coupled to one or more sensors using relatively small wires (e.g., wires which transmit a relatively low voltage) as well as one or more power supply wires (e.g., to provide AC power to a heating element or the like) that may have a relatively large size.

Figure 8:
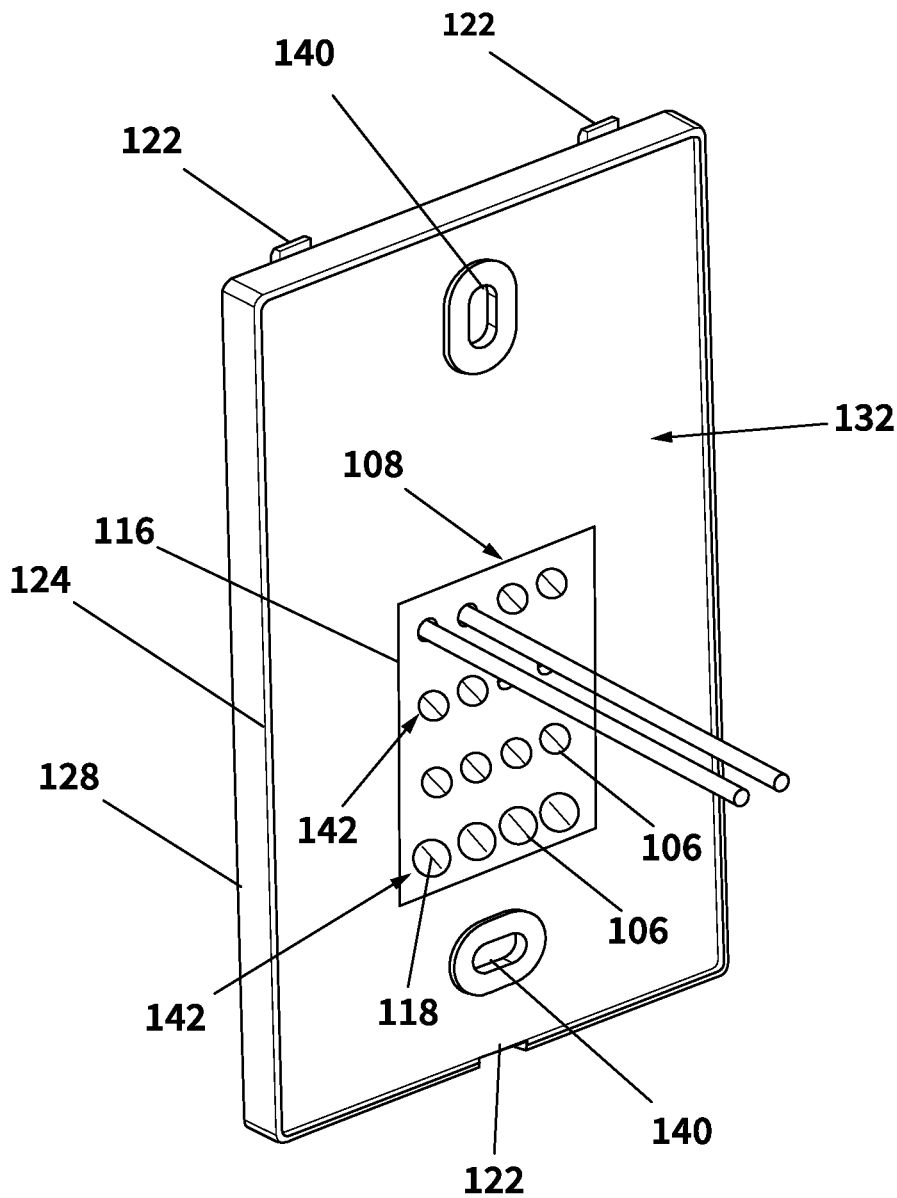
FIG. 8 is a rear perspective view of the air intrusion barrier secured to the rear surface of the back plate and a plurality of wires extending through the plurality of wire openings and the air intrusion barrier, consistent with the present disclosure.

Turning now to FIG. 8, one or more of the air intrusion barriers 108 may be located on the rear surface 132 of the back plate 104. Locating the air intrusion barrier 108 on the rear surface 132 of the back plate 104 may reduce the adhesive requirements of the adhesive layer 116 compared to locating the air intrusion barrier 108 on the front surface 130 of the back plate 104, thereby allowing for less adhesive to be used and/or less expensive adhesive. In particular, when the air intrusion barrier 108 is secured to the rear surface 132 of the back plate 104, the force applied to the air intrusion barrier 108 as the wires 101 are advanced through the air intrusion barrier 108 is transmitted generally towards the back plate 104. In contrast, when the air intrusion barrier 108 is disposed on the front surface 130 of the back plate 104, the force applied to the air intrusion barrier 108 as the wires 101 are advanced through the air intrusion barrier 108 is generally away from the back plate 104. In the latter case, the adhesive layer 116 must be sufficiently strong to overcome this force, whereas in the former case, the adhesive layer 116 does not have to overcome this force.

The air intrusion barrier 108 may optionally include wire opening indicia 142 configured to denote the locations of the wire openings 106. Absent the wire opening indicia 142, it may be difficult for an installer to determine where the wire openings 106 are located when the air intrusion barrier 108 is disposed on the rear surface 132 and extends over the wire openings 106. The wire opening indicia 142 will allow the installer to easily align and push the wires 101 through the air intrusion barrier 108 and the wire openings 106. In one example, the wire opening indicia 142 may include different colored regions than the rest of the air intrusion barrier 108. Alternatively (or in addition), the wire opening indicia 142 may include the perforations 118. The size of the wire opening indicia 142 may be smaller than the size of the wire openings 106.

Figure 9:
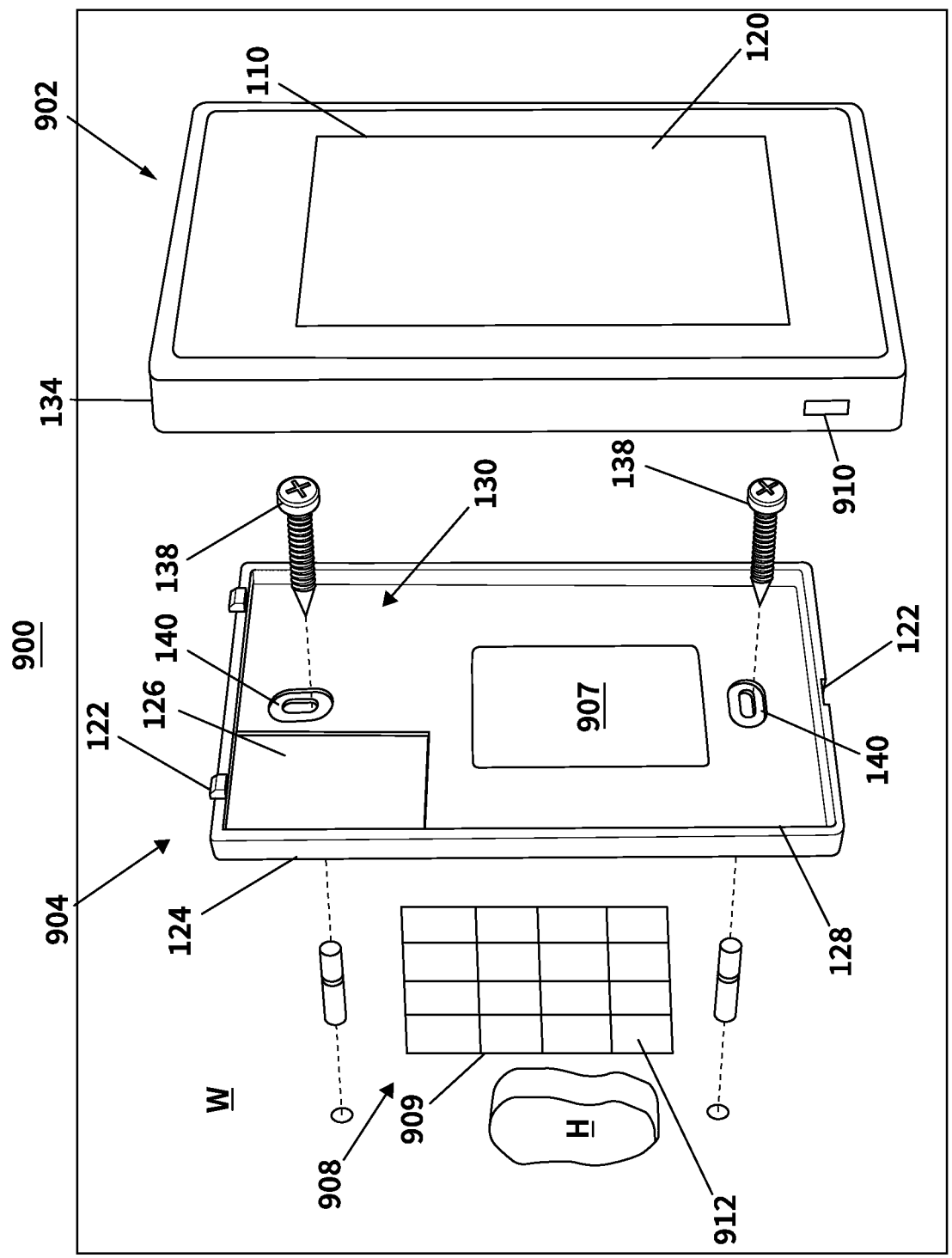
FIG. 9 is an exploded view of another example of a HVAC controller assembly including an air intrusion barrier having a support frame, consistent with the present disclosure.
Figure 10:
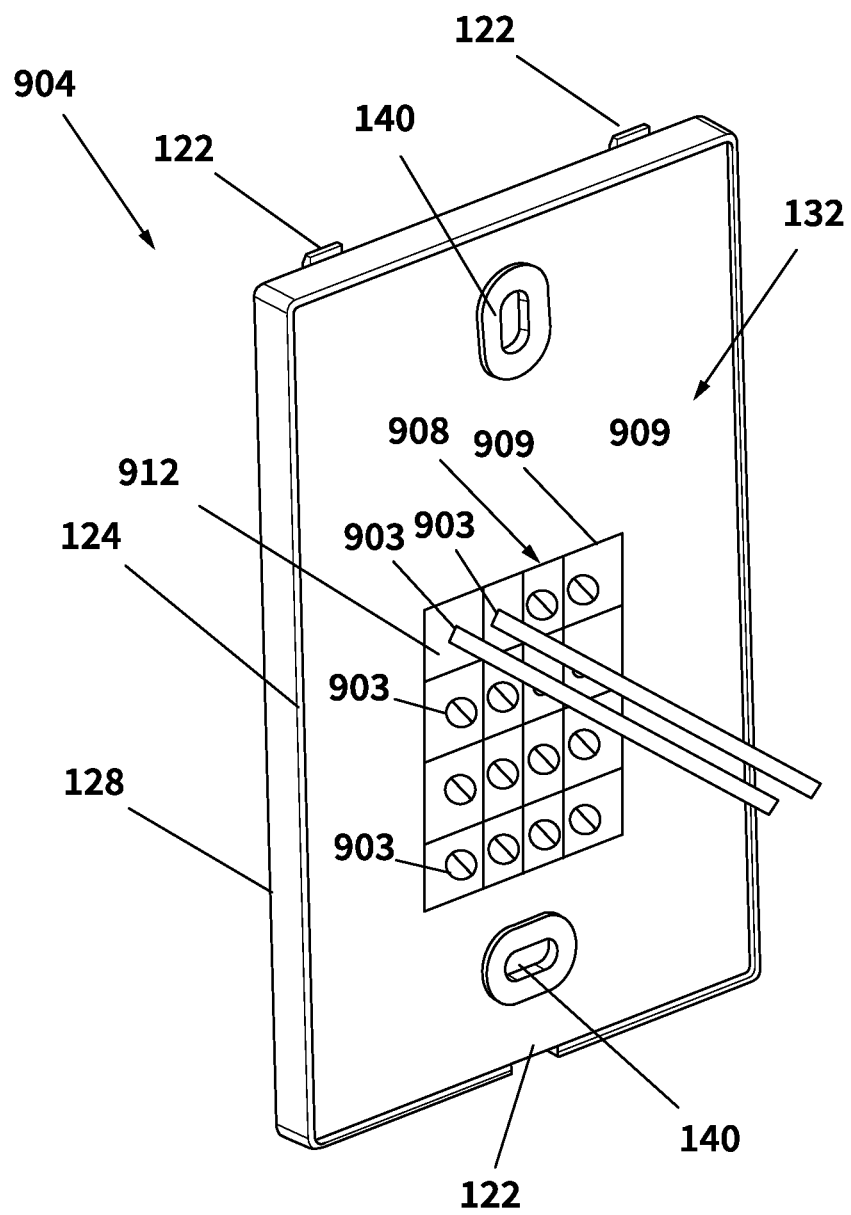
FIG. 10 is a rear view of the air intrusion barrier of FIG. 9 secured to a back plate, consistent with the present disclosure.
Figure 11:
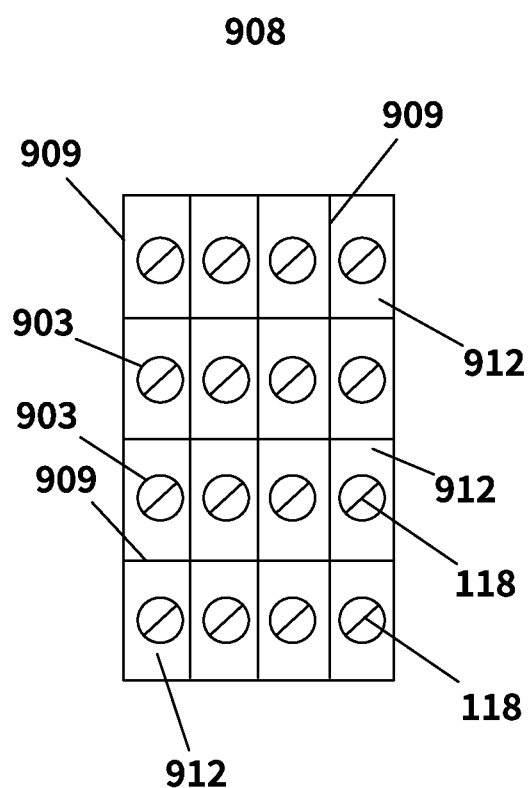
FIG. 11 is a front view of the air intrusion barrier of FIG. 9, consistent with the present disclosure.

With reference to FIGS. 9-11, another example of a HVAC controller assembly 900 consistent with the present disclosure is generally illustrated. The HVAC controller assembly 900 may include a front cover 902, a back plate 904, at least one air intrusion barrier 908, and HVAC controller circuitry 910. The front cover 902 and HVAC controller circuitry 910 may include any front cover and HVAC controller circuitry described herein. Whereas the HVAC controller assemblies 100 described previously include a plurality of wire openings 106 formed in the back plate 104 that each substantially correspond to the size of each one of the plurality of wires 101, the back plate 904 of the HVAC controller assembly 900 in FIGS. 9-11 may include one or more enlarged passageways 907 that are configured to receive a plurality of wires 101. The air intrusion barrier 908 may be disposed on and/or secured to the front or rear surface of the back plate 904 such that it extends over the enlarged passageways 907. The air intrusion barrier 908 may include one or more rigid support structures 909 (e.g., rigid support walls or frame) and at least one membrane 912 (e.g., a layer of resiliently flexible material) configured to generally form a plurality of seals with the wires 101 to reduce and/or eliminate undesired air currents. The rigid support structures 909 (and optionally membrane 912) may at least partially define a plurality of wire openings 903. Each of the plurality of wire openings 903 may be sized and/or shaped to substantially correspond to the cross-section (e.g., outer diameter) of each one of the plurality of wires 101. Put another way, each of the plurality of wire openings 903 may be sized and/or shaped to receive only a single wire 101, and each wire 101 may extend through a different wire opening 903. The rigid support structures 909 may therefore be similar to the wire openings 106 in the sense that the rigid support structures 909 may form a frame that is be configured to substantially support the wires 101 to generally reduce/minimize movement of the wires 101 (e.g., lateral movement) relative to the back plate 904 and/or prevent wire lateral forces from damaging the air intrusion barrier 908 during installation. The air intrusion barrier 908 may be particularly useful as a retrofit kit for existing HVAC controller assemblies. It should also be appreciated, however, that the air intrusion barrier 908 of FIGS. 9-11 may also be used with a back plate 104 including a plurality of wire openings 106.

Figure 12:
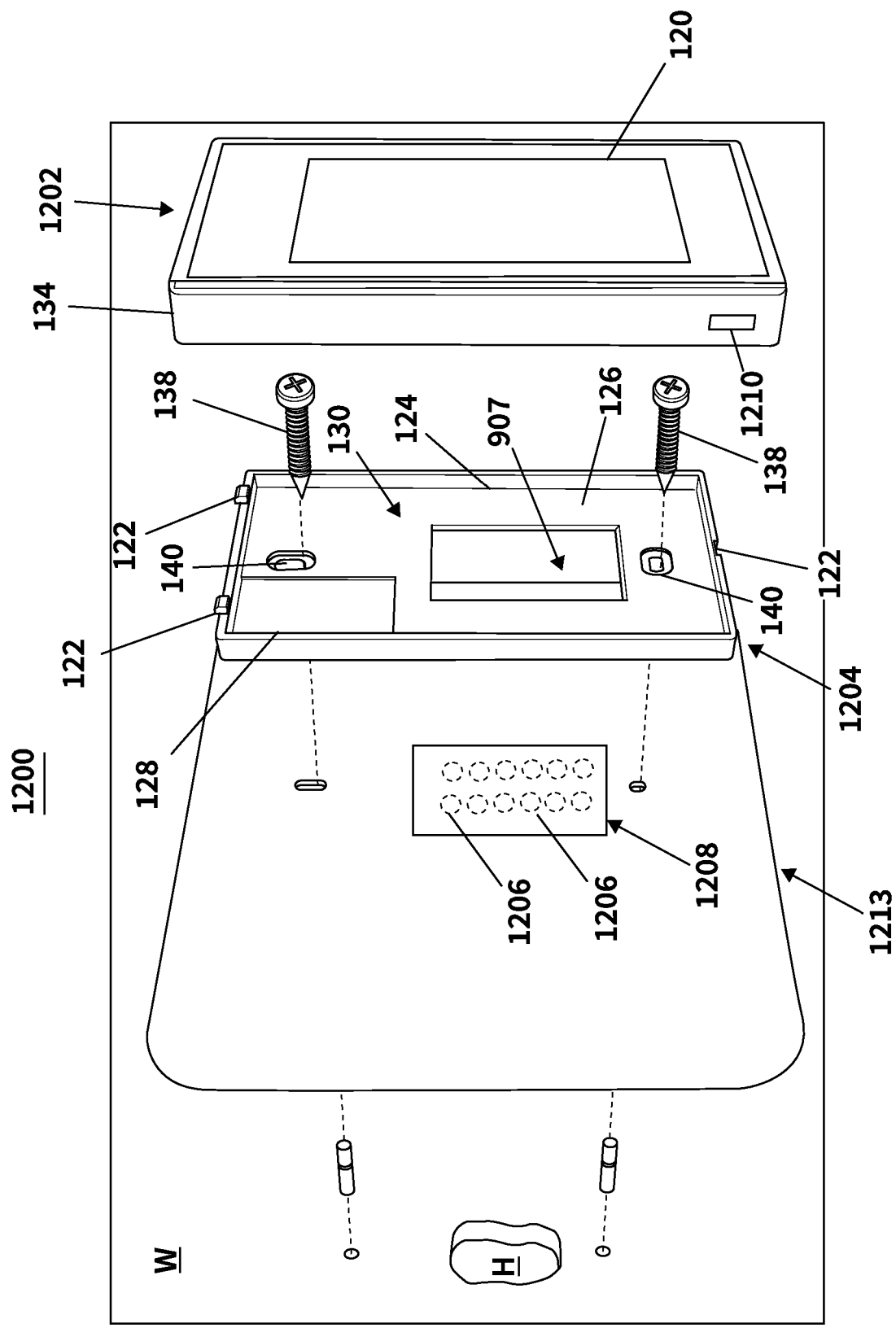
FIG. 12 is an exploded view of yet another example of a HVAC controller assembly including a front plate, a back plate, a wall plate, and an air intrusion barrier, consistent with the present disclosure.

Any of the HVAC controller assemblies described herein may optionally include a wall plate. The wall plate may be used, for example, in an application where the wall W has damage extending beyond the perimeter (e.g., width and/or height) of the back plate. The wall plate may therefore be disposed between the back plate and the wall W. Turning to FIG. 12, one example of an HVAC controller assembly 1200 including a wall plate consistent with the present disclosure is generally illustrated. The HVAC controller assembly 1200 may include a front cover 1202, a back plate 1204, a wall plate 1213, at least one air intrusion barrier 1208, and HVAC controller circuitry 1210. The front cover 1202 and HVAC controller circuitry 1210 may include any front cover and HVAC controller circuitry described herein. The back plate 1204 may include any back plate described herein (e.g., a back plate 104 including a plurality of wire openings 106 each sized to substantially correspond to the size of each one of the plurality of wires 101 or a back plate 904 including one or more enlarged passageways 907 configured to receive a plurality of wires 101). The back plate 1204 may optionally be used in combination with any of the air intrusion barriers described herein. The air intrusion barrier 1208 may correspond to any of the air intrusion barriers described herein.

Similar to the back plate 104 shown in FIGS. 1-8, the wall plate 1213 may include a plurality of wire openings 1206 (shown in broken lines) each sized to substantially correspond to the size of each one of the plurality of wires 101. One or more air intrusion barriers 1208 may be disposed on and/or secured to the front and/or rear surface of the wall plate 1213 (for example, but not limited to, by way of an adhesive layer). The plurality of wire openings 1206 may be configured to substantially support the wires 101 to generally reduce/minimize movement of the wires 101 (e.g., lateral movement) relative to the wall plate 1213 and/or prevent wire lateral forces from damaging the air intrusion barrier 1208 during installation. The air intrusion barrier 1208 may also generally form a plurality of seals against the wires 101, thereby reducing and/or eliminating undesired air currents.

Figure 13:
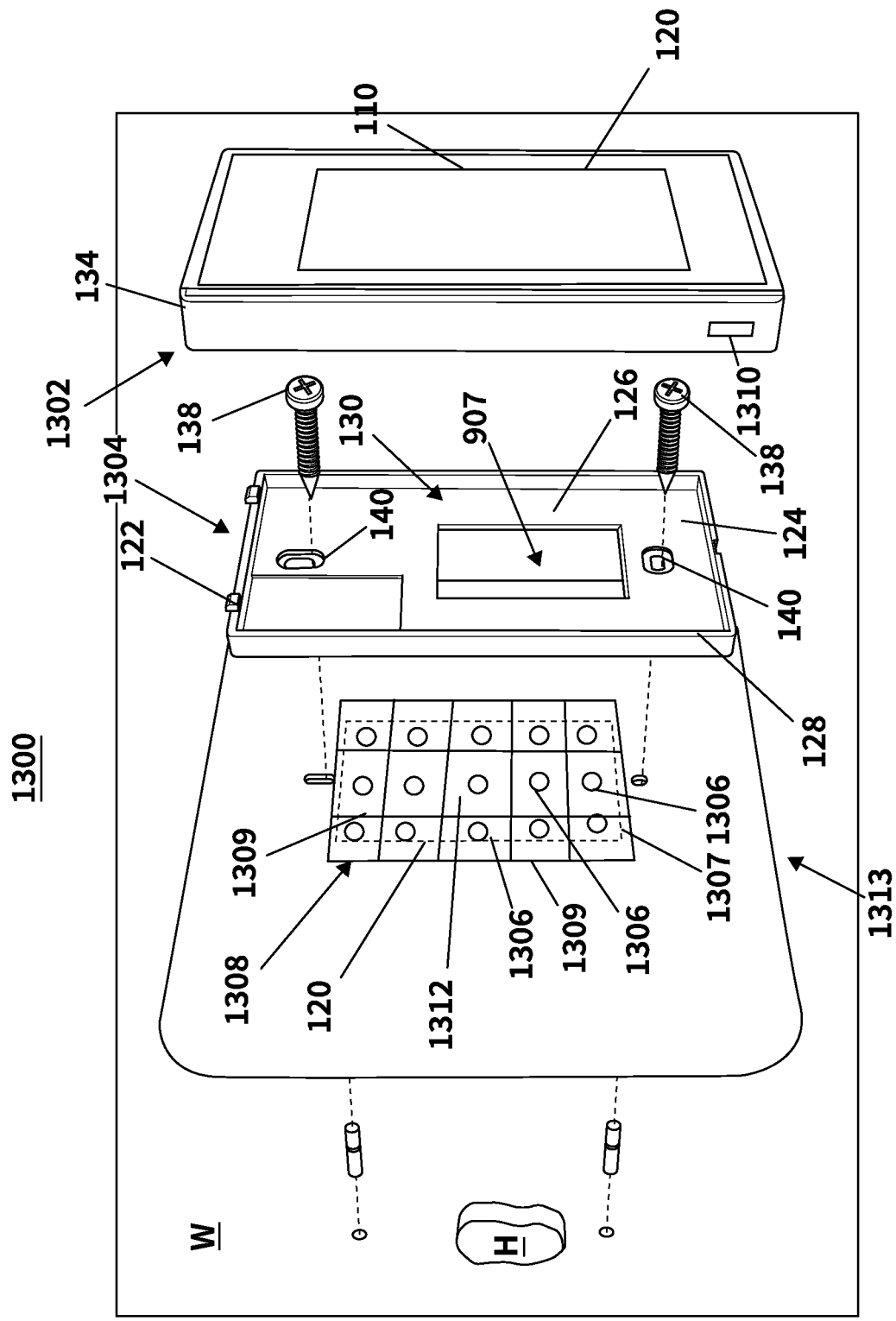
FIG. 13 is an exploded view of a further example of a HVAC controller assembly including a front plate, a back plate, a wall plate, and an air intrusion barrier, consistent with the present disclosure.

Turning now to FIG. 13, another example of an HVAC controller assembly 1300 including a wall plate consistent with the present disclosure is generally illustrated. The HVAC controller assembly 1300 may include a front cover 1302, a back plate 1304, a wall plate 1313, at least one air intrusion barrier 1308, and HVAC controller circuitry 1310. The front cover 1302 and HVAC controller circuitry 1310 may include any front cover and HVAC controller circuitry described herein. The back plate 1304 may include any back plate described herein (e.g., a back plate 104 including a plurality of wire openings 106 each sized to substantially correspond to the size of each one of the plurality of wires 101 or a back plate 904 including one or more enlarged passageways 907 configured to receive a plurality of wires 101). The back plate 1304 may optionally be used in combination with any of the air intrusion barriers described herein. The air intrusion barrier 1308 may correspond to any of the air intrusion barriers described herein.

Whereas the HVAC controller assemblies 1200 described previously include a plurality of wire openings 1206 in the wall plate 1213 that each substantially correspond to the size of each one of the plurality of wires 101, the wall plate 1313 of the HVAC controller assembly 1300 in FIG. 13 may include one or more enlarged passageways 1307 configured to receive a plurality of wires 101. The air intrusion barrier 1308 may be similar to the air intrusion barrier 908 described above in connection with FIGS. 9-11, however, the air intrusion barrier 1308 may be disposed on and/or secured to the front or rear surface of the wall plate 1313 such that it extends over the enlarged passageways 1307. The air intrusion barrier 1308 may include one or more rigid support structures (e.g., rigid support walls or frame) 1309 and at least one membrane 1312 (e.g., a layer of a resiliently flexible material) configured to generally form a plurality of seals with the wires 101 to reduce and/or eliminate undesired air currents. The rigid support structure(s) 1309 and/or membrane 1312 may define a plurality of wire openings 1306. Each of the plurality of wire openings 1306 may be sized and/or shaped to substantially correspond to the cross-section (e.g., outer diameter) of each one of the plurality of wires 101. Put another way, each of the plurality of wire openings 1306 may be sized and/or shaped to receive only a single wire 101, and each wire 101 may extend through a different wire opening 1306. The rigid support structures 1309 may therefore be similar to the wire openings 106 in the back plate 104 in the sense that the rigid support structures 1309 may form a frame that is be configured to substantially support the wires 101 and generally reduce/minimize movement of the wires 101 (e.g., lateral movement) relative to the wall plate 1313 and/or prevent wire lateral forces from damaging the air intrusion barrier 1308 during installation. The air intrusion barrier 1308 may be particularly useful as a retrofit kit for existing HVAC controller assemblies. It should also be appreciated, however, that the air intrusion barrier 1308 of FIG. 13 may also be used with a back plate 104 including a plurality of wire openings 106 and/or a wall plate 1213 having a plurality of wire openings 1206.

It should be appreciated that in any of the examples described herein, the air intrusion barrier may include a layer of plastic configured to cover the plurality of wire openings. The layer of plastic could be broken off and/or removed to expose the plurality of wire openings and allow the wires to be advanced through. Non-limiting examples of the layer of plastic include PVC or ABS. As may be appreciated, the layer of plastic should be formed from a brittle material and/or thickness that allows it to easily break away. In at least one example, the layer of plastic may be less than 0.01 inch thick (e.g., 0.005 inch or less) PVC and/or ABS.

In accordance with an aspect, the present disclosure may feature a heating, ventilation, and/or air condition (HVAC) controller assembly configured to be mounted to a wall of a controlled space. The HVAC controller assembly may include a front cover, a back plate, HVAC controller circuitry, a plurality of wire openings, and an air intrusion barrier. The front cover includes at least one input/output device and the back plate is configured to be removably secured to the front cover and further configured to be positioned between the front cover and the wall. The HVAC controller circuitry is configured to be electrically coupled to one or more HVAC components of an HVAC system by way of a plurality of wires extending through a hole in the wall. The HVAC controller circuitry may be configured to adjust one or more environmental characteristics of the controlled space. The HVAC controller circuitry may be secured to/disposed on at least one of the front cover or the back plate.

Each of the plurality of wire openings is configured to receive only a single wire of the plurality of wires, and each of the plurality of wires is configured to extend through a different one of the plurality of wire openings. The air intrusion barrier is configured to extend across the plurality of wire openings and further configured to receive the plurality of wires and generally form a plurality of seals against the plurality of wires. The plurality of wire openings are configured to substantially support the plurality of wires to reduce movement of the plurality of wires relative to the air intrusion barrier. In at least one example, two or more of the plurality of wire openings have the same size. Alternatively (or in addition), two or more of the plurality of wire openings have different sizes.

Optionally, the plurality of wire openings extend through the back plate. The air intrusion barrier may be configured to be secured to the back plate. For example, the air intrusion barrier may include at least one membrane configured to form the plurality of seals against the plurality of wires and an adhesive layer configured secure the air intrusion barrier to the back plate. In at least one example, the air intrusion barrier may be configured to be secured to a front surface of the back plate, the front surface facing towards the front cover when the HVAC controller assembly is secured to the wall. Alternatively (or in addition), the air intrusion barrier may be configured to be secured to a rear surface of the back plate. The air intrusion barrier may further include wire opening indicia configured to denote locations of the plurality wire openings.

The air intrusion barrier may include one or more rigid support structures and at least one membrane. The rigid support structures may at least partially define the plurality of wire openings and the membrane may extend over the plurality of wire openings and be configured to generally form the plurality of seals with the plurality of wires. The back plate may include an enlarged passageway configured to receive the plurality of wires, and the air intrusion barrier may extend over the enlarged passageway. Optionally, the HVAC controller assembly may further include a wall plate configured to abut against the wall and against the back plate. The wall plate may include an enlarged passageway configured to receive the plurality of wires, and the air intrusion barrier may extend over the enlarged passageway.

The air intrusion barrier may include at least one membrane configured to form a plurality of seals against the plurality of wires and one or more perforations configured to be generally aligned with the plurality of wire openings. Optionally, the air intrusion barrier may include at least one woven material and membrane configured to form the plurality of seals against the plurality of wires.

In at least one example, the plurality of wire openings may extend through the wall plate. The air intrusion barrier may be configured to be secured to the wall plate, for example, to the front and/or the rear surface of the wall plate.

In accordance with another aspect, the present disclosure may feature a HVAC controller assembly including HVAC controller circuitry, a front cover including at least one input/output device, a back plate, and an air intrusion barrier. The HVAC controller circuitry may be configured to be electrically coupled to a plurality of wires extending through a hole in the wall to adjust one or more environmental characteristics of a controlled space and may be part of at least one of the front cover or the back plate. The back plate may be configured to be removably secured to the front cover and may include a plurality of wire openings. Each of the plurality of wire openings may be configured to receive only a single wire of the plurality of wires, and each of the plurality of wires may be configured to extend through a different one of the plurality of wire openings. The air intrusion barrier may be configured to extend across the plurality of wire openings and receive the plurality of wires through individual holes formed in the air intrusion barrier which individually seal against the plurality of wires. The air intrusion barrier may optionally include at least one membrane configured to form the individual seals against the plurality of wires and an adhesive layer configured secure the air intrusion barrier to the back plate.

The term substantially, as generally referred to herein, refers to a degree of precision within acceptable tolerance that accounts for and reflects minor real-world variation due to material composition, material defects, and/or limitations in manufacturing processes. Such variation may therefore be said to achieve largely, but not necessarily wholly, the target/nominal characteristic. To provide one non-limiting numerical example to quantify "substantially," such a modifier is intended to include minor variation that can cause a deviation of up to and including ±10% from a particular stated quality/characteristic unless otherwise provided by the present disclosure.

The term "coupled" as used herein refers to any connection, coupling, link or the like between elements/components. In contrast, directly coupled refers to two elements in contact with each other in a manner that does not include an intermediate element/component disposed therebetween.

The use of the terms "first," "second," and "third" when referring to elements herein are for purposes of clarity and distinguishing between elements, and not for purposes of limitation. Likewise, like numerals are utilized to reference like elements/components between figures.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that any HVAC controller assembly described herein may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A heating, ventilation, and/or air condition (HVAC) controller assembly configured to be mounted to a wall of a controlled space, the HVAC controller assembly comprising:
   a front cover including at least one input/output device;
   a back plate configured to be removably secured to the front cover, the back plate configured to be positioned between the front cover and the wall;
   HVAC controller circuitry configured to be electrically coupled to one or more HVAC components of an HVAC system by way of a plurality of wires extending through a hole in the wall, the HVAC controller circuitry configured to adjust one or more environmental characteristics of the controlled space,
   a plurality of wire openings, each of the plurality of wire openings configured to receive only a single wire of the plurality of wires and each of the plurality of wires configured to extend through a different one of the plurality of wire openings; and
   an air intrusion barrier configured to extend across the plurality of wire openings, the air intrusion barrier configured to receive the plurality of wires and to generally form a plurality of seals against the plurality of wires;
   wherein the plurality of wire openings are configured to substantially support the plurality of wires to reduce movement of the plurality of wires relative to the air intrusion barrier.

2. The HVAC controller assembly of claim 1, wherein the plurality of wire openings extend through the back plate.

3. The HVAC controller assembly of claim 2, wherein the air intrusion barrier is configured to be secured to the back plate.

4. The HVAC controller assembly of claim 3, wherein the air intrusion barrier further comprises at least one membrane configured to form the plurality of seals against the plurality of wires and an adhesive layer configured secure the air intrusion barrier to the back plate.

5. The HVAC controller assembly of claim 3, wherein the air intrusion barrier is configured to be secured to a front surface of the back plate, the front surface facing towards the front cover when the HVAC controller assembly is secured to the wall.

6. The HVAC controller assembly of claim 3, wherein the air intrusion barrier is configured to be secured to a rear surface of the back plate, the rear surface facing towards the wall when the HVAC controller assembly is secured to the wall.

7. The HVAC controller assembly of claim 6, wherein the air intrusion barrier further includes wire opening indicia configured to denote locations of the plurality wire openings.

8. The HVAC controller assembly of claim 1, wherein the air intrusion barrier further includes one or more rigid support structures and at least one membrane, the one or more rigid support structures at least partially defining the plurality of wire openings and the least one membrane extending over the plurality of wire openings and configured to generally form the plurality of seals with the plurality of wires.

9. The HVAC controller assembly of claim 8, wherein the back plate includes an enlarged passageway configured to receive the plurality of wires, and wherein the air intrusion barrier extends over the enlarged passageway.

10. The HVAC controller assembly of claim 8 further comprising a wall plate configured to abut against the wall and against the back plate, the wall plate further including an enlarged passageway configured to receive the plurality of wires, and wherein the air intrusion barrier extends over the enlarged passageway.

11. The HVAC controller assembly of claim 1, wherein the air intrusion barrier further comprises at least one membrane configured to form the plurality of seals against the plurality of wires and one or more perforations configured to be generally aligned with the plurality of wire openings.

12. The HVAC controller assembly of claim 1, wherein the air intrusion barrier further comprises at least one woven material and membrane configured to form the plurality of seals against the plurality of wires.

13. The HVAC controller assembly of claim 1, wherein at least one of the front cover or the back plate at least partially define at least one air passageway open to the controlled space for providing air to the HVAC circuitry, wherein the air intrusion barrier is configured to reduce undesired air currents from flowing through the at least one air passages.

14. The HVAC controller assembly of claim 1 further comprising a wall plate, wherein the plurality of wire openings extend through the wall plate.

15. The HVAC controller assembly of claim 14, wherein the air intrusion barrier is configured to be secured to the wall plate.

16. The HVAC controller assembly of claim 1, wherein at least two of the plurality of wire openings have the same size.

17. The HVAC controller assembly of claim 1, wherein at least two of the plurality of wire openings have different sizes.

18. The HVAC controller assembly of claim 1, wherein the HVAC controller circuitry is part of at least one of the front cover or the back plate.

19. A heating, ventilation, and/or air condition (HVAC) controller assembly configured to be mounted to a wall of a controlled space, the HVAC controller assembly comprising:

HVAC controller circuitry configured to be electrically coupled to a plurality of wires extending through a hole in the wall to adjust one or more environmental characteristics of the controlled space,
a front cover including at least one input/output device;
a back plate configured to be removably secured to the front cover, the back plate including a plurality of wire openings, each of the plurality of wire openings configured to receive only a single wire of the plurality of wires and each of the plurality of wires configured to extend through a different one of the plurality of wire openings, wherein the HVAC controller circuitry is part of at least one of the front cover or the back plate; and
an air intrusion barrier configured to extend across the plurality of wire openings, the air intrusion barrier configured to receive the plurality of wires through individual holes formed in the air intrusion barrier which individually seal against the plurality of wires.

20. The HVAC controller assembly of claim 19, wherein the air intrusion barrier includes at least one membrane configured to form the individual seals against the plurality of wires and an adhesive layer configured to secure the air intrusion barrier to the back plate.

* * * * *